Figure 1:
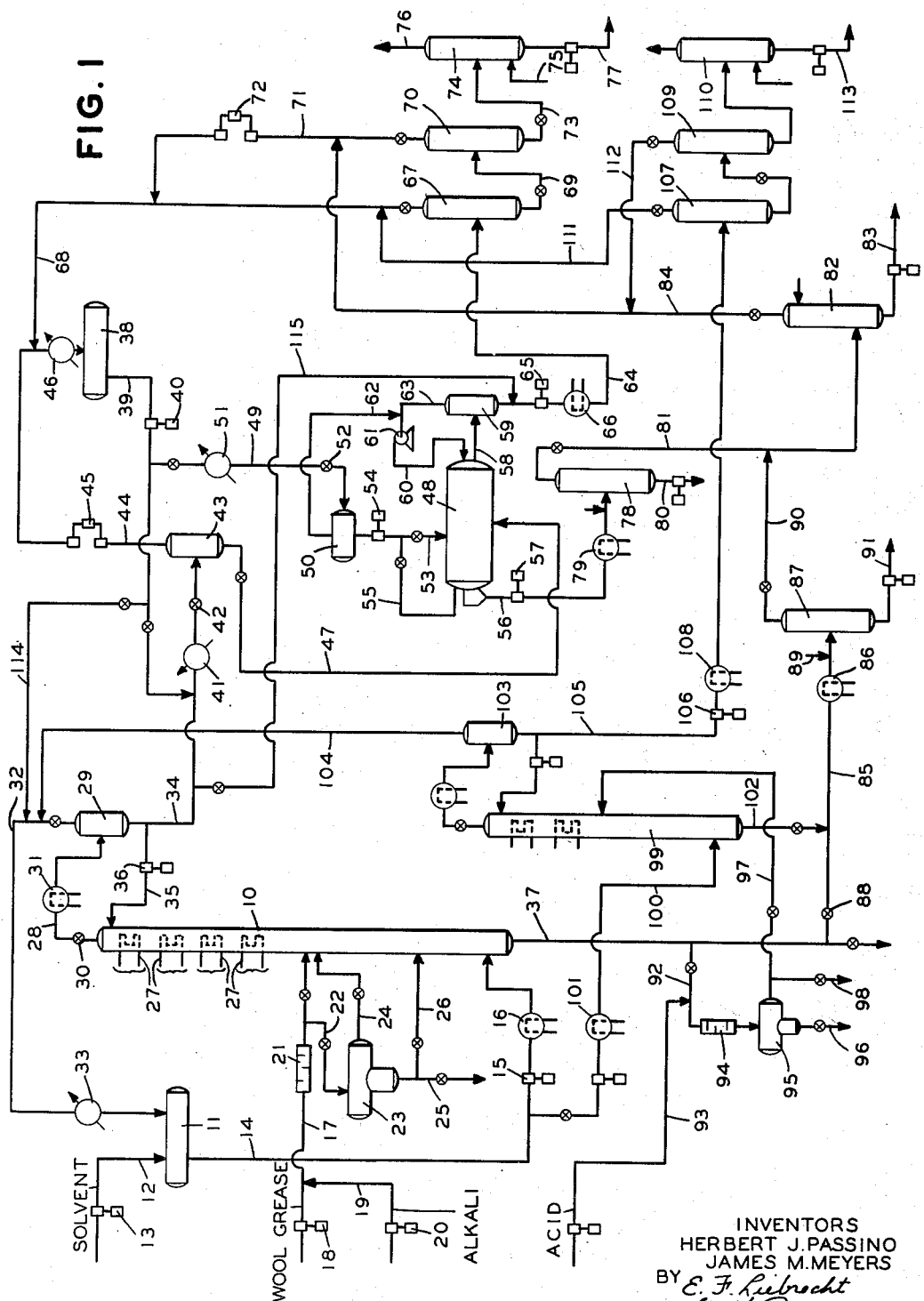

Aug. 18, 1953

H. J. PASSINO ET AL 2,649,466

REFINING WOOL FAT

Filed Oct. 25, 1947

2 Sheets-Sheet 2

INVENTORS
HERBERT J. PASSINO
JAMES M. MEYERS
BY C. F. Liebrecht
G. N. Palmer
ATTORNEYS Patented Aug. 18, 1953

2,649,466

UNITED STATES PATENT OFFICE 2,649,466

REFINING WOOL FAT

Herbert J. Passino, Englewood, N. J., and James M. Meyers, Rochester, N. Y., assignors to The M. W. Kellogg Company, Jersey City, N. J., a corporation of Delaware Application October 25, 1947, Serial No. 782,174

12 Claims. (Cl. 260—426)

This invention relates to an improved process for refining wool fat and to a new method for treating wool fat to separate it into valuable fractions.

As used in this specification and claims the term wool fat relates principally to wool grease, which is the raw material obtained by treating raw wool with a scouring solution or solvent. Wool grease is obtained principally by scouring the raw wool with dilute soap or alkaline solutions. Varying amounts of alkali may be added to the soap solutions if required by the type of wool being treated. The wash liquid is then withdrawn from the wool and treated to remove the soap solution from the wool grease. This may be accomplished by centrifuging, which yields a relatively dry product, or by acidification and settling, which yields a wet, relatively poor quality material, degras. Wool grease may be separated from raw wool also by means of suitable solvents, such as petroleum ether.

The term wool fat as used in the following specification and claims also includes wool wax, which is neutralized wool grease, and lanolin, which is hydrated wool fat.

In accordance with the improved method of this invention the wool fat is neutralized, if not already neutral, and treated under carefully controlled conditions with a suitable solvent to separate a small fraction of the wool fat in which are concentrated the color bodies of the original wool fat. The remainder of the wool fat, comprising all but a minor percentage of the original wool fat, is recovered as a refined neutral product of very light color and is suitable for any of the uses to which refined wool waxes ordinarily are adapted. In a preferred modification the invention also comprises separation of the refined wool fat into a solid wool fat wax and a liquid wool fat oil. The improved process also includes in a preferred modification the step of concentrating the sterols of the wool fat into a fraction which is recovered as a separate refined product of the process.

The treatment of the wool fat to remove color bodies and to concentrate the sterol content of the wool fat involves, in accordance with the improved process, treatment of the wool fat by means of a selective solvent at temperatures in a range extending from about 100° F. below the critical temperature of the solvent to a few degrees above the critical temperature of the solvent. Since the fractionation requires the use of solvents which are not miscible in all proportions at the operating temperature, the solvents employed in the process are those whose critical temperatures are not substantially higher than 450° F. Preferably, the process employs solvents whose critical temperatures are lower than 325° F., in order to avoid high temperatures which might injure the wool fat.

The low-boiling hydrocarbons represent a desirable class of solvents because of their relative inertness and low cost. The low-boiling olefins may be employed, but they are less desirable than the low-boiling paraffins, as the paraffins are more inert. Of the paraffins, propane and the butanes are preferred ordinarily because of the high degree of solubility of the wool fat in these solvents and their relatively low critical temperatures, which permit operating the process in a temperature range not injurious to the wool fat. However, ethane or the pentanes can be employed as solvents in the process. While relatively pure hydrocarbons ordinarily are preferred, mixtures of solvents may be employed. For example, mixtures of ethane and propane, or mixtures of propane and butane, or mixtures of methane and butane may be employed in suitable proportions.

While the low-boiling hydrocarbons are advantageous for use in the process because of their low cost other solvents having relatively low critical temperatures may be employed, such as ammonia, dichlordifluoromethane, dimethyl ether, methyl fluoride, and halogenated hydrocarbons in general.

It will be understood that, since the solvents employed are either normally gaseous or would be vaporized at atmospheric pressure at the temperatures normally employed in the process, it is necessary to impose on the treating zone a substantial super-atmospheric pressure to maintain the contents of the zone in liquid condition, and when relatively high temperatures are employed this may involve an operating pressure of 500 to 1000 pounds per square inch.

Figure 2:
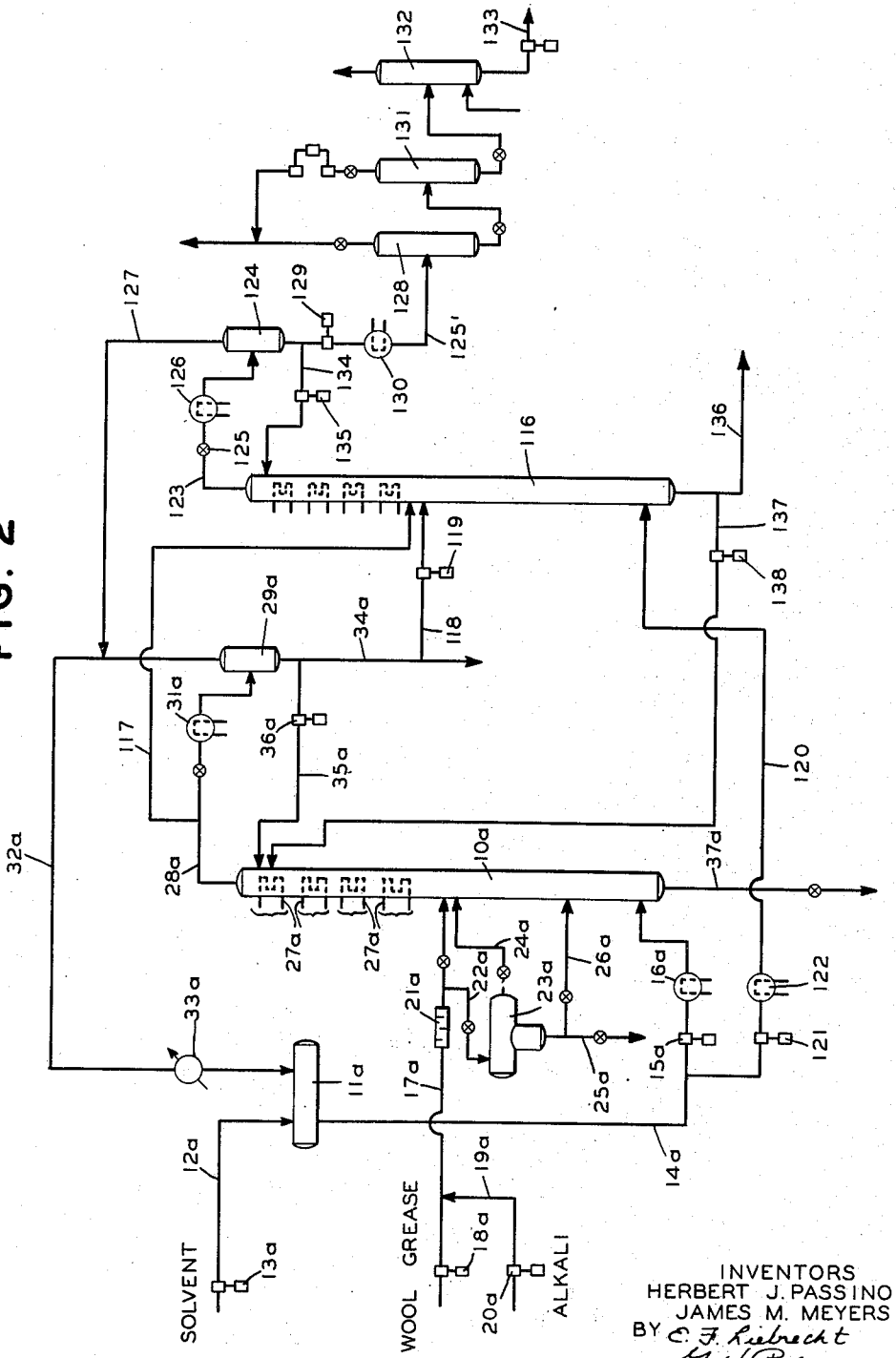

The invention will be described further in more detail by reference to the accompanying drawings, in which Fig. 1 is a diagrammatic view in elevation of an arrangement of apparatus for carrying out various preferred modifications of the invention, and in which Fig. 2 illustrates a further modification of the invention. In Fig. 2 certain of the pieces of equipment and transfer lines shown are identical with pieces of equipment and transfer lines in Fig. 1. Such similar equipment and lines are identified in Fig. 2 by the same reference numbers employed in Fig. 1, with the subscript "a." It will be understood, therefore, that the description of the operation of such apparatus and lines in Fig. 1 applies also to the same pieces of equipment and lines shown in Fig. 2.

The invention will be described in detail by reference to the treatment of wool grease as defined above, although it will be understood that the methods of operation are applicable also to the treatment of wool wax and lanolin, as defined above. In the further description of the invention propane and butane will be referred to as the solvents, but it is to be understood that the principles of operation are the same in the use of any of the preferred solvents mentioned above, the operating conditions being changed only in accordance with the composition of the wool fat and the physical properties of the solvent.

In Fig. 1 the principal piece of equipment employed is an elongated vertical fractionating column or solvent extraction tower 10. Tower 10 is adapted to produce intimate contact of counter-flowing liquid phases and thus may be equipped with suitable contact means, such as packing, baffles, or trays. The solvent for use in tower 10 is supplied from reservoir tank 11. The supply of solvent in tank 11 is maintained by the return of solvent recovered in the process and by the addition of small amounts of makeup solvent from line 12 containing a pump 13. The solvent circulated in the process in a circuit including tank 11 is maintained at somewhat higher temperatures than another quantity of the same type of solvent used in another part of the process. Consequently, the solvent circulating through tank 11 will be referred to as hot solvent to distinguish it from the other cold solvent whose use will be described below.

Hot solvent from tank 11 is transferred to a low point in tower 10 through line 14 by means of pump 15. Heating means 16 are provided in line 14 to heat the solvent to the temperature desired in the bottom of tower 10. The solvent flows upwardly in tower 10 as a substantially continuous phase in counter-current contact with a descending lower phase liquid stream containing wool fat, and the final extract solution is withdrawn from the top of tower 10.

The wool grease to be treated in the process is introduced through line 17 by means of pump 18. To render the wool grease charge easier to pump, it may be diluted with a small portion of the solvent prior to introduction of the charge through line 17. While the wool grease may be treated in tower 10 without prior neutralization, it is preferred in accordance with this invention to neutralize the wool grease before treatment in tower 10 rather than neutralize the products obtained from tower 10. In accordance with this preferred modification a suitable alkali, such as an aqueous solution of sodium hydroxide, having a concentration of 10 to 50 percent, is introduced into line 17 from line 19 by means of pump 20. A mixer 21 is provided in line 17 to produce intimate mixing of the wool grease and alkali solution and complete the neutralization reaction.

The mixture of neutralized wool grease, alkali solution and soaps may be introduced directly into tower 10 at an intermediate point to effect in tower 10 simultaneous fractionation of the neutral wool grease and separation and washing of wool grease from the soaps and alkali solution. Alternatively, a preliminary separation of the soaps and neutral oil is effected outside tower 10. For this purpose the mixture is passed from line 17 through line 22 to a settling tank 23. From settling tank 23 the neutral wool fat is transferred to tower 10 at an intermediate point thereof by means of line 24. The mixture of soaps and alkali solution is withdrawn from the bottom of tank 23 through line 25. Alternatively, this material may be introduced through line 26 into tower 10 at a point near the bottom thereof to effect washing of the soaps by the fresh solvent to recover entrained wool fat.

Aside from the washing of soaps which may be introduced into the lower portion of tower 10, the function of this tower essentially is solvent fractionation of the wool grease with the liquefied solvent in counter-current contact under refluxing conditions. Tower 10 is operated to separate a final solvent phase overhead, which contains the greater part of the wool grease in solution, and to separate a final raffinate phase as a bottoms product containing a concentration of the color bodies of the wool grease charged to tower 10. Tower 10 is constructed in a manner to stand a sufficiently high internal pressure to maintain the solvent in a liquefied condition under the highest temperature to be used in the tower. This maximum will depend upon the boiling characteristics and the critical temperature of the solvent or solvent mixture employed.

For efficient operation of tower 10 it may be desirable or necessary to heat the contents of the tower to maintain differentials in pressure between certain locations in the tower. This may involve heating the upflowing solvent phase in the upper part of the tower to maintain a temperature differential or gradient between the top of the tower and the lower part of the tower. Heating means for this purpose are indicated diagrammatically by coils 27, which are placed above the point of introduction of the wool grease. It will be understood, however, that the location of the heating coils depends entirely upon the location at which it is desired to supply heat.

In the normal operation of tower 10 the solvent stream introduced through line 14 flows upwardly in tower 10 in counter-current contact with a relatively heavy lower, or raffinate, phase. The volumetric ratio of solvent to wool grease, and the temperature, pressure, and reflux conditions are regulated whereby the wool grease and solvent are only partly miscible, whereby there are formed a solvent or extract phase and a lower or raffinate phase. The solvent phase contains all but a small proportion of the solvent employed and that proportion of the wool grease which it is desired to extract. The lower phase, or raffinate phase, contains only a small proportion of the solvent and a larger proportion of the wool grease in a solvent: fat ratio much lower than the corresponding ratio in the extract phase. The raffinate, or lower, phase is susbtantially heavier than the extract phase and flows downwardly in the tower to the bottom thereof.

Facilities are provided for maintaining the pressure on tower 10 sufficiently high to maintain the contents thereof in liquid condition and provide a sufficient margin over the minimum pressure necessary at the highest temperature to permit slight adjustments of pressure during the operation. The maximum temperature employed in tower 10 ordinarily will not be more than 15 or 20° F. above the critical temperature of the solvent, and ordinarily the maximum temperature in tower 10 will be lower than such critical temperature. The critical temperature of propane is 206.3° F. and the critical pressure is 617.4 p. s. i. The critical temperature of normal butane is 307.6° F. and the critical pressure is 529.2 p. s. i. Thus, when using propane as the solvent the maximum operating pressure will be in the range of 600–700 p. s. i. while the maximum pressure necessary when employing butane will be somewhat lower.

The temperature in the top of tower 10 is maintained at the level necessary, in view of the solvent:fat ratio employed, the degree of refluxing employed, and the pressure on tower 10, to dissolve in the solvent phase at that point only those ingredients of the wool fat desired in the overhead product of tower 10. In general, it may be said that relatively high temperatures in the top of tower 10 are associated with relatively high solvent:fat ratios and relatively low reflux ratios. When employing propane as the solvent the temperatures necessary in the top of tower 10 ordinarily are in the range of 170–220° F. When employing normal butane the top temperatures in tower 10 ordinarily will fall within the range of 270–320° F. If a mixture of normal and iso-butanes is employed the top temperature in tower 10 may be as low as 250° F.

The temperature in the bottom of tower 10, which is controlled by the temperature of the incoming stream of solvent, may be maintained at the same level as the top temperature. Preferably, however, for efficient operation a substantial temperature gradient is maintained in tower 10. The range of temperatures employed in the bottom of tower 10 when using propane is approximately 140–220° F. When employing the butanes the bottom temperature ordinarily will not be lower than about 200° F. The temperature differential between the top and the bottom of tower 10 may vary from 1° F. to 60° F. In general, the range of operating temperatures is from a temperature 15 to 20° F. above the critical temperature of the solvent to a temperature 100° F. below such critical temperature.

The top and bottom temperatures contained in tower 10 must be correlated to permit withdrawal of wool fat from the top and bottom of tower 10 in the desired ratio and at a combined rate of withdrawal equal to the rate at which wool fat is charged to tower 10 from line 17 plus the rate of return of wool fat to tower 10 as reflux material. The bottom temperature is selected with the object of excluding from the lower phase withdrawn from the bottom of the tower as much as possible of the constituents of the fat which it is desired to include in the overhead product. However, the temperature in the bottom of tower 10 must be maintained above any temperature at which there occurs complete miscibility of the fat with the solvent in all proportions. A relatively low bottom temperature is maintained in tower 10 when it is desired to withdraw as a bottoms product only a small proportion of the fat charged to tower 10, as when operating tower 10 to decolorize the wool fat. In general, relatively high bottom temperatures are associated with relatively high solvent:fat ratios, and vice versa.

The efficiency of tower 10 in concentrating the color bodies in a small raffinate phase is due to the intensive refluxing of the tower which is carried out at one or more points above the points of introduction of fat into tower 10. Such refluxing may be achieved by maintaining a substantially higher temperature in the top of the tower than at lower points in the tower. The solvent phase which has become saturated with fat in the lower part of tower 10, at the temperature prevailing there, is heated in the top of the tower to a temperature at which it is unable to retain all of the fat dissolved therein. This results in precipitation of a part of the fat previously dissolved in the solvent phase. The precipitated fat forms a separate, relatively heavy, liquid phase containing a small amount of solvent in a solvent:fat ratio much lower than that of the solvent phase.

The solvent phase may be heated from the lowest temperature in the tower to the highest temperature at any one of the points occupied by heating coils 27. It is preferred, however, to heat the solvent phase to successively higher temperatures as it passes upwardly in contact with the series of heating coils 27, in order to induce precipitation along the length of the zone occupied by coils 27. While these coils may be located entirely above the charging point of the wool fat, as indicated in Fig. 1, the operation is not limited to this arrangement, as heating elements may be provided below the charging point or along the entire length of tower 10.

Tower 10 is divided into two zones by the wool fat charging point. The upper zone is the rectification zone, whose function is the separation of the constituents of the wool fat. The lower zone is primarily a stripping zone, in which the undissolved wool fat and the lower phase material precipitated in the rectification zone are subjected to the stripping action of the solvent stream to dissolve in the solvent stream all constituents of the fat which it is desired to exclude from the final raffinate phase. Rectification also occurs in the stripping zone as an inherent part of the counter-current stripping treatment and as a result of the passage into the stripping zone of the relatively more soluble lower phase material precipitated in the rectification zone. That part of the latter material which is not redissolved in the lower parts of the rectification zone combines with the undissolved portion of the charge to form a combined lower phase which flows downwardly through the stripping zone. As the solvent flows up from the bottom of tower 10 it absorbs fat until it is saturated. Thereafter, any additional quantities of fat dissolved by the solvent stream in the stripping zone are balanced by corresponding precipitation of less soluble portions of the fat.

The rectification of the solvent phase in the stripping zone is intensified if a temperature gradient is maintained in that zone. Whether or not the temperature gradient in tower 10 is maintained throughout the length of the tower depends somewhat upon the extent of stripping which is made possible by the facilities provided. If the principal function of tower 10 is the recovery of ingredients from the bottom phase, as when employing the tower for decolorizing, it may be desirable to maintain the stripping zone substantially uniformly at the lowest temperature, whereby the temperature of the solvent phase at the fat charge point is substantially the same as the bottom temperature. Alternatively, a slight temperature gradient may be maintained in the stripping zone, in combination with a greater temperature gradient in the rectification zone.

In the rectification zone the solvent phase is subjected to treatment which continuously reduces the solvent power of the solvent phase for the less soluble constituents of the fat, as the solvent phase flows upwardly through the rectification zone. This results in the precipitation of the lower phase, as described, and the linear velocity of the solvent phase must be maintained sufficiently low in the rectification zone to permit the downward flow of this lower phase. As the lower phase flows downwardly from a point of precipitation it contacts solvent phase which is at a lower temperature and which contains fat dissolved therein in excess of the equilibrium amount at that temperature and also contains an excessive quantity of the less soluble constituents of the fat in view of the composition of the lower phase with which it is in contact at that point. As a result of all these effects there is absorption of a part of the downflowing lower phase and precipitation from the solvent phase of the previously dissolved fat. Consequently, as the lower phase flows downwardly in the rectification zone it is subjected to the stripping action of the solvent phase whereby the more soluble portions of the fat are redissolved and whereby less soluble portions are precipitated to the lower phase. This effect occurs throughout the length of the rectification zone, whereby the fat in that zone is subjected to continuous precipitation, resolution and reprecipitation.

Instead of heating means 27, other means may be provided to regulate the temperature of the solvent phase. For example, a portion of the solvent may be diverted from line 14, heated to a temperature above the bottom temperature, and introduced into tower 10 at an elevated point. The fat charge to the tower through line 17 also may be preheated to assist heating the solvent phase. Furthermore, a portion of the solvent may be premixed with the fat charge before admission of the latter to tower 10. This is particularly desirable when the fat is a solid or a highly viscous liquid at the temperature at which it is to be charged.

In addition to the maintenance of a temperature gradient in the rectification zone to decrease the solvent power of the solvent phase for the less soluble constituents of the fat, this effect can be achieved by changing the pressure or by preferentially dissolving in the solvent phase portions of the fat which are more soluble therein than some of the fat previously dissolved in the solvent phase. The methods involving control of temperature and pressure may be employed independently, but each also involves the preferential resolution in the solvent phase of portions of the fat which are more soluble therein than some of the fat previously dissolved when the lower phase, formed by precipitation, is flowed through the rectification zone in counter-current contact with the solvent phase. However, the establishment of a lower phase and the rectification of the solvent phase can be effected without varying the temperature or pressure. Rectification of tower 10 by varying the pressure is a less desirable method, as it requires dividing the rectification zone into a series of separate compartments. The solvent phase would then be passed through such separate compartments at progressively lower pressure to effect precipitation in each compartment. The precipitate in each compartment would then be pumped into the next lower compartment. This method of operation requires more elaborate equipment and is less efficient.

Alternative to the maintenance of a temperature gradient, or in combination with that method, the solvent power of the solvent phase for the less soluble constituents of the fat can be decreased by preferentially dissolving in the solvent phase portions of the fat which are more soluble than some of the fatty constituents which are already dissolved in the solvent phase. This is accomplished by recovering at least a portion of the fat component of the final solvent phase withdrawn from the top of tower 10 and returning it to the top of the tower. In accordance with this method of operation the solvent phase passes out of tower 10 through line 28 to an overhead receiver 29. The pressure is reduced at valve 30 to permit all, or substantially all, of the solvent to evaporate. This operation may be assisted by heating the mixture, as by heating means 31 in line 28. Instead, receiver 29 may be maintained at the tower pressure while evaporating the solvent solely by the application of heat. In either operation it is not essential to evaporate the solvent entirely, and it is ordinarily preferable to effect only partial evaporation whereby some solvent is left in the liquid phase in receiver 29. In the arrangement illustrated in Fig. 1, all the solvent phase from tower 10 is shown as flowing through line 28 to receiver 29. It is evident, however, that the reflux liquid required may be obtained by passing to receiver 29 only a part of the solvent phase from tower 10, containing fatty constituents in the amount required for refluxing. In that case the remainder of the solvent phase is passed elsewhere for further handling.

The solvent evaporated and separated in receiver 29 is withdrawn therefrom through line 32, which connects with hot solvent storage tank 11. A cooler 33 is provided to recondense the vaporized solvent.

The liquid phase material remaining in receiver 29 is withdrawn through line 34. That part of this material desired for refluxing tower 10 is diverted from line 34 through line 35 which is provided with a pump 36 and connects with the upper part of tower 10. If desired, temperature control means may be provided in line 35 to bring the reflux liquid to the desired temperature.

The reflux liquid which is returned to tower 10 through line 35 is more concentrated in fats than is the solvent phase at the reflux point in tower 10. Since the solvent phase at that point is substantially saturated with fats the introduction of reflux liquid causes a redistribution of the fat at that point. The more soluble portions of the reflux liquid are dissolved in the solvent phase and there is a corresponding precipitation of less soluble fatty constituents from the solution. The precipitate and the undissolved portion of the reflux liquid form a second liquid phase which then flows down tower 10 in counter-current contact with the upwardly flowing solvent phase. As the lower phase flows downwardly there is a continuous redistribution of fat between the solvent phase and the lower phase. At each point in the rectification zone the most soluble fatty constituents of the lower phase are dissolved in the solvent phase, with a corresponding precipitation of less soluble fatty constituents in the solvent phase. Thus the lower phase becomes more concentrated in the less soluble portions of the fat as it passes down the tower and the solvent phase becomes more concentrated in the more soluble constituents of the fat as it passes upwardly through the rectification zone.

The operating factors described above in connection with the use of a temperature gradient for refluxing tower 10 generally are applicable to the method of operation involving external refluxing, except that a somewhat lower top temperature is required in the tower to carry overhead in the solvent phase the somewhat larger quantity of fat which is required to provide reflux liquid. When operating tower 10 with external refluxing through line 35 the temperature may be uniform from top to bottom of the tower. This temperature may be one which would cause complete miscibility of the fat with the solvent in the ratio in which these are charged to the tower but which under equilibrium conditions produces only partial miscibility. Tower 10 may be brought to equilibrium conditions by returning all the overhead product through line 35 until the quality of that product is satisfactory. During that time the accumulation of reflux fat in the solvent phase in the tower lowers the solvent power of the solvent phase for the fat charge to the point at which the solvent phase has the desired selectivity as a solvent. In any of the above methods of operating tower 10 the ratio of solvent to fat charge to tower 10 should be relatively high. A ratio of at least 3:1 is generally necessary, and ratios as high as 100:1 may be employed. The temperature gradient and external refluxing methods of accomplishing rectification of tower 10 advantageously are combined in a single operation. Thus, while the temperature gradient is maintained by means of heating coils 27, tower 10 is refluxed through line 35. This combined method of operation provides close control of the operation of the tower.

The raffinate phase collects in the bottom of tower 10 and the upper level of this phase may be maintained at any desirable height which may be above or below the point at which the solvent is introduced from line 14. Lower phase material is withdrawn continuously from the bottom of the tower through line 37.

To illustrate the operation of tower 10 in the decolorizing of crude wool grease reference is made to the following examples.

EXAMPLE I

In this operation the fractionation of wool grease to effect decolorization was carried out in a continuous fractionating zone provided by two 18-foot towers, the first being a 4-inch baffled column and the second a 2-inch packed tower. The propane solvent was introduced at a point 2 feet from the bottom of the first tower, and the extract phase from that tower was introduced at a point 2 feet from the bottom of the second tower. The wool grease was introduced at a point 4 feet from the top of the first tower, and the lower phase from the bottom of the second tower was pumped back to the top of the first tower at a point 1 foot from the top thereof. The color bodies concentrate was obtained as a lower phase in the first tower and the decolorized wool grease was obtained in solution in the extract phase withdrawn from the top of the second tower. This operation, carried out for purposes of convenience in two towers, provided therefore in effect a single continuous fractionating zone which would be provided by a single tower of the necessary length. The two towers employed in this example provided a length of 12 feet in the stripping zone and a length of 20 feet in the rectifying zone. The temperature at the top of the second tower was maintained at 174° F., while the temperature at the bottom of the first tower was 110° F. The temperature at the wool grease charging point was 113° F. Thus the temperature gradient in the rectifying section was 3° F. per foot, while that in the stripping section was 0.25° F. per foot.

The wool grease was charged to the process at the rate of 256 pounds per hour per square foot of cross sectional area of the 2-inch tower, while propane was charged at the rate of 4610 pounds per hour per square foot. The propane velocity was 145.7 feet per hour on the basis of the 2-inch tower. The residence time was 34.6 minutes. The propane:wool grease ratio was 33.5 by volume and 17.9 by weight. The reflux ratio, which is the ratio of overhead product of the second tower returned as reflux to the ratio of such product withdrawn from the system, was 0.85. The wool grease feed was premixed with 2.1 volumes of propane to increase fluidity. The results obtained in this operation are indicated in the following table, in which are set forth the analyses of the crude wool grease and the products recovered from the bottom of the first tower and the top of the second tower.

Table 1

| Analysis | Crude Wool Grease | Overhead | Bottoms |
|---|---|---|---|
| Oil Yields, Wt. Percent | | 69.6 | 30.4 |
| Free Fatty Acids, Percent (as Oleic) | 8.23 | 5.54 | 13.4 |
| Free Fatty Acid Recovery, Percent | | 46.8 | 49.4 |
| Unsaponifiable Oil, Wt. Percent | 42.3 | 47.1 | 28.6 |
| Unsaponifiable Oil Recovery, Percent | | 77.5 | 20.6 |
| Iodine No. (Wijs) | 41.7 | 41.2 | 38.2 |
| Saponification No | 117 | 105 | 134 |
| Color, Gardner | >18 | 9 | >18 |
| Color, NPA | ¹ 4 | 2+ | ² 3½ |
| Moisture and Volatility, Wt. Percent | 1.23 | 0.07 | 0.17 |
| Sulfur, Wt. Percent | 0.52 | 0.43 | 0.83 |
| Sulfur Recovery, Percent | | 57.6 | 48.5 |
| Melting Point, °C | 39.0 | 37.0 | 48.0 |
| Ash, Wt. Percent | 0.08 | 0.00 | 0.17 |
| Specific Gravity | 0.948 | 0.927 | 1.009 |

¹ Single dilution.
² Double dilution.

In this operation the crude wool grease, obtained from the wool by solvent extraction with naphtha, was separated into a 69.6 overhead fraction of greatly improved color, and the physical and chemical properties of the overhead product otherwise were substantially different from the properties of the crude wool grease. The presence of sulfur in the product results from chemical treatment of the sheep. When insecticides free from sulfur are employed sulfur is not an important factor in the wool grease products. Sulfur may be removed before or after processing by treatment with sodium sulfite. Conveniently this treatment can be carried out by adding sodium sulfite to a 10 percent caustic solution employed for neutralizing the wool grease.

A blend of overhead products obtained in the operating run exemplified by Table 1 was further fractionated in two different operations to produce a small final overhead fraction and a somewhat larger final overhead fraction. The conditions employed in these operations, designated below as Operation A and Operation B, were as follows:

Table 2

| Operating Conditions | A | B |
|---|---|---|
| Temperature, °F.: | | |
| Top | 215 | 217 |
| Feed | 197 | 198 |
| Bottom | 183 | 184 |
| Temperature Gradient, °F./Ft.: | | |
| Rectifying Section | 0.90 | 0.95 |
| Stripping Section | 1.17 | 1.17 |
| Throughput, Lbs./Hr./Sq. Ft. (Basis 2-inch tower): | | |
| Oil | 164 | 159 |
| Propane | 3,140 | 3,140 |
| Propane Velocity, Ft./Hr. (Basis 2-inch tower) | 100.2 | 100.2 |
| Residence Time, Min | 23.8 | 23.8 |
| Propane-to-Oil Ratio (By Volume, 60° F.) | 35.1 | 36.1 |
| Propane-to-Oil Ratio (By Weight) | 19.1 | 19.7 |
| Reflux Ratio | 13.9 | |
| Height of Rectifying Section, Ft | 20 | 20 |
| Height of Stripping Section, Ft | 12 | 12 |

The results obtained in Operations A and B are indicated in Tables 3 and 4 below, in which are set forth analyses of the charge stock and the overhead and bottoms products in Operations A and B.

Table 3

| Analysis | Charge | A Overhead | A Bottoms |
|---|---|---|---|
| Oil Yields, Wt. Percent | | 10.2 | 89.8 |
| Free Fatty Acids, Percent (As Oleic) | 4.63 | 15.6 | 3.35 |
| Free Fatty Acid Recovery, Percent | | 34.4 | 65.0 |
| Unsaponifiable Oil, Wt., Percent | 47.7 | 60.9 | 47.0 |
| Unsaponifiable Oil Recovery, Percent | | 13.0 | 88.5 |
| Iodine No. (Wijs) | 44.6 | 21.7 | 47.6 |
| Saponification No | 101 | 113 | 97 |
| Color, Gardner | 11– | 9 | 12– |
| Color, NPA | 4– | 2 | 4– |
| Moisture and Volatility, Wt. Percent | 0.66 | 0.54 | 0.09 |
| Sulfur, Wt. Percent | 0.44 | 1.79 | 0.10 |
| Sulfur Recovery, Percent | | 41.5 | 20.4 |
| Melting Point, °C | 36.2 | 55.2 | 40.4 |
| Ash, Wt. Percent | 0.0 | 0.00 | 0.00 |
| Specific Gravity | 0.926 | 0.893 | 0.930 |

Table 4

| Analysis | Charge | B Overhead | B Bottoms |
|---|---|---|---|
| Oil Yields, Wt. Percent | | 27.0 | 73.0 |
| Free Fatty Acids, Percent (As Oleic) | 4.63 | 11.6 | 2.27 |
| Free Fatty Acid Recovery, Percent | | 67.6 | 35.8 |
| Unsaponifiable Oil, Wt. Percent | 47.7 | 57.4 | 44.2 |
| Unsaponifiable Oil Recovery, Percent | | 32.5 | 67.6 |
| Iodine No. (Wijs) | 44.6 | 41.0 | 47.8 |
| Saponification No | 101 | 117 | 98 |
| Color, Gardner | 11– | 9 | 12 |
| Color, NPA | 4– | 2– | 4 |
| Moisture and Volatility, Wt. Percent | 0.66 | 0.05 | 0.09 |
| Sulfur, Wt. Percent | 0.44 | 1.27 | 0.12 |
| Sulfur Recovery, Percent | | 77.9 | 19.9 |
| Melting Point, °C | 36.2 | 44.8 | 40.4 |
| Ash, Wt. Percent | 0.0 | 0.00 | 0.00 |
| Specific Gravity | 0.926 | 0.913 | 0.931 |

In Operation A the 10 percent final overhead fraction represented a concentration of unsaponifiable components. After removal of sulfur and fatty acids this product would contain 80 percent unsaponifiable components and thus constitute a highly concentrated sterol product of the process, of light color and low iodine number. The overhead product of Operation B also was a highly concentrated sterol product representing a somewhat higher recovery of unsaponifiables.

The overhead product of the first operation, identified in Table 1, was subjected to fractional crystallization by chilling in pentane. In this operation the decolorized wool grease was dissolved in 5 volumes of pentane. The solution was cooled at the rate of approximately 2° F. per minute to a temperature of 0° F. The solid and liquid phases were separated at that temperature by filtration. The filtered solid was washed with 2 volumes of pentane and was then repulped with 2 volumes of pentane, and refiltered. The refiltered solid was then washed with 1 volume of pentane. By this means the decolorized wool grease was separated into a solid wool fat wax and a liquid wool fat oil. The wax, representing 29 weight percent of the decolorized wool fat, had a melting point of 52° C. and an iodine number of 30. The wool fat oil, representing 71 weight percent of the decolorized wool fat, had an iodine number of 60. The decolorized wool fat wax was a sterol product of high concentration and light color. The decolorized wool fat oil was a valuable product of light color which did not cloud on standing.

EXAMPLE II

In this operation a dry, centrifugally recovered crude wool grease of relatively low free fatty acid content was continuously fractionated with butane in the same pilot plant equipment employed in Example I. In this operation, however, the crude wool grease was first neutralized by the addition of 1.7 weight percent of 10 percent aqueous sodium hydroxide solution, this representing a 50 percent excess over the theoretical requirement of alkali for neutralization of the free fatty acid. The resulting mixture was held at a temperature of 160° F., thoroughly stirred, and pumped into the first tower at the charge point, which in this operation was 9 feet from the top of the first tower. The conditions employed in this operation are set forth in the following table:

Table 5

| | |
|---|---|
| Tower temperatures, °F.: | |
| Top | 295 |
| Feed | 295 |
| Bottom | 294 |
| Temperature gradient, °F./ft.: | |
| Rectifying section | 0.0 |
| Stripping section | 0.14 |
| Throughout, lb./hr./sq. ft. in 2-inch tower: | |
| Oil | 261 |
| Butane | 3340 |
| Butane velocity, ft./hr. in 2-inch tower | 91.1 |
| Butane-to-oil ratio (by vol., 60° F.) | 20.3 |
| Butane-to-oil ratio (by wt.) | 12.8 |
| Residence time, min | 48.0 |
| Reflux ratio | 0.52 |
| Height of rectifying section, ft | 25 |
| Height of stripping section, ft | 7 |

The results obtained in this operation are indicated in Table 6 below, in which are set forth analyses of the raw wool grease and the overhead and bottoms products.

Table 6

| | Charge | Overhead | Bottoms |
|---|---|---|---|
| Oil Yields, Wt. Percent | | 95.8 | 4.2 |
| Color, NPA | 3–S. D. | 3– | |
| Color, Lovibond | | 75Y–17.5R | |
| Free Fatty Acids, Percent (As Oleic) | 0.76 | 0.19 | 2.42 |
| Free Fatty Acid Recovery, Percent | | 23.9 | 13.4 |
| Unsaponifiable Oil, Wt. Percent | 45.8 | 49.0 | 22.5 |
| Unsaponifiable Oil Recovery, Percent | | 102.5 | 2.1 |
| Iodine No. (Wijs) | 41 | 45 | 32 |
| Saponification No | 92 | 87 | 93 |
| Melting Point, °C | 40.1 | 40.6 | [1]82 |
| Moisture, Wt. Percent | 0.7 | 0.1 | 0.1 |
| Cloud Point, °F | 120 | 112 | |
| Pour Point, °F | 100 | 95 | |
| Ash, Wt. Percent | 0.15 | 0.00 | 2.84 |
| Specific Gravity | 0.935 | 0.932 | |

[1] ASTM ring and ball.

The foregoing operation was conducted primarily as a treatment to neutralize and decolorize wool grease, and the foregoing data indicate that this was successfully accomplished. The color (NPA) was reduced from 3— (single dilution) in the crude wool grease to 3— in the overhead product. The neutralization also reduced the acid content from 0.76 to 0.19 percent (as oleic). The other physical and chemical properties of the overhead product differed only slightly from the crude grease. The inorganic material in the feed was removed in the bottoms product, in addition to the small amount of caustic added to neutralize the free fatty acids. Consequently the bottoms product had a high melting point and a low unsaponifiable oil content.

The overhead product of Table 6 was subjected to fractional crystallization by chilling in propane to obtain a wool fat wax and a wool fat oil. The oil and wax were separated by filtration, and the wax was washed with fresh propane to remove residual oil therefrom. The conditions of this operation for two operating periods are set forth below in Table 7.

*Table 7*

| Operating Conditions: | | |
|---|---|---|
| Propane/Oil Ratio (Vol.) | 3.3 | 3.2 |
| Solution Temperature, °F | 140 | 140 |
| Chilling Rate, °F./Min | 1 | 1 |
| Filtration Temperature, °F.— | | |
| Start | −10 | −10 |
| Average | −10 | −10 |
| End | −10 | −10 |
| Filtration Pressure, p. s. i. g | 15 | 25 |
| Filtration Time, Min | 8.4 | 5.5 |
| Filtration Rate, Gal./Hr./Ft.²— | | |
| Average | 2.26 | 4.30 |
| 10 Minutes | 2.07 | 3.25 |
| Wax Washing (Output Basis): | | |
| Number of Washes | 2 | 2 |
| Total Wash, Vol. Percent | 264 | 194 |
| Total Oil Recovered, Wt. Percent | 14.1 | 8.1 |
| Yields (Output Basis): | | |
| Oil, Wt. Percent | 53.9 | 55.8 |
| Wax, Wt. Percent | 46.1 | 44.2 |

The wax and oil products of these two periods were blended for product inspection. The blended products had the following analysis:

*Table 8*

| | Oil | Wax |
|---|---|---|
| Color, NPA | 4½ | 3½ |
| Color, Lovibond (1″ of Oil) | 75Y−12R | 35Y−4R |
| Free Fatty Acids, Percent (As Oleic) | 0.19 | 0.26 |
| Cloud Point, °F | 70 | |
| Pour Point, °F | 30 | 120 |
| Specific Gravity, 60°/60° | 0.948 | 0.912 |
| Iodine Number (Wijs) | 62 | 40 |

The wool fat wax and the wool fat oil of Table 8 were stripped with steam to reduce the relatively strong odor. In this operation the oil or wax was subjected to stripping with steam for one hour at a pressure of 4 mm. of mercury and at a temperature of 225° F. Steam equivalent to 9–10 weight percent of the oil or wax was employed. The deodorized wool fat wax and the deodorized wool fat oil had the following analyses:

*Table 9*

| | Oil | Wax |
|---|---|---|
| Color, NPA | 4— | 3½ |
| Color, Lovibond (1″ of Oil) | 75Y−11R | 50Y−5.6R |
| Free Fatty Acids, Percent (As Oleic) | 0.18 | 0.26 |
| Unsaponifiable Oil, Wt. Percent | 53.5 | 45.2 |
| Iodine No. (Wijs) | 62 | 40 |
| Cloud Point, °F | 62 | 126 |
| Pour Point, °F | | 115 |
| Melting Point, °C | | 48.0 |
| Specific Gravity | 0.951 | 0.915 |

The fractional crystallization separated the higher melting constituents from the liquid components. The solid fraction was lighter in color than the oil. The free fatty acid content of the wax was slightly higher than the oil, but its iodine value was only 40 compared with 62 in the oil. The deodorization had relatively small effect upon the properties of the materials other than the reduction of the odor. The color of the wax was increased from 35Y−4R to 50Y−5.6R, while the oil was reduced in color from 75Y−12R to 75Y−11R. The removal of traces of solvent raised the specific gravity of each product 0.003. The unsaponifiable oil content of the wax was less than that of the oil, indicating the removal of the higher melting sterols from the liquid product.

*Example III*

In this operation a crude wool grease, obtained from the wool by solvent extraction with naphtha, was treated to obtain a decolorized neutralized product. During one-half the operating period the crude wool grease was neutralized by the addition of 6.5 weight percent of 20 percent aqueous sodium hydroxide solution, this representing a 30 percent excess over the theoretical requirement. During the remainder of the operation the crude wool grease was neutralized with 2.7 weight percent of 50 percent aqueous sodium hydroxide solution, this representing a 30 percent excess over the theoretical requirement. The neutralized mixture was held at a temperature of 160° F., thoroughly stirred, and pumped into the first tower of the pilot plant referred to in previous examples. In this operation the charge point was 9 feet from the top of the first tower. The conditions employed in this operation are set forth in the following table:

*Table 10*

| | |
|---|---|
| Tower temperature, °F.: | |
| Top | 297 |
| Feed | 297 |
| Bottom | 294 |
| Temperature gradient, °F./ft.: | |
| Rectifying section | 0.0 |
| Stripping section | 0.43 |
| Throughput, lb./hr./sq. ft. in 2-inch tower: | |
| Oil | 240 |
| Butane | 3340 |
| Butane velocity, ft./hr. in 2-inch tower | 91.1 |
| Butane-to-oil ratio (by vol., 60° F.) | 22.4 |
| Butane-to-oil ratio (by wt.) | 13.9 |
| Residence time, min. | 48.2 |
| Reflux ratio | 0.75 |
| Height of rectifying section, ft. | 25 |
| Height of stripping section, ft. | 7 |

The results obtained in this operation are indicated in Table 11 below, in which are set forth analyses of the raw wool grease and the overhead and bottoms products.

*Table 11*

| | Charge | Overhead | Bottoms |
|---|---|---|---|
| Oil Yields, Wt. Percent | | 78.7 | 21.3 |
| Color, NPA | 4 S. D. | 4½— | |
| Color, Lovibond | | 75Y−78R | |
| Free Fatty Acids, Percent (As Oleic) | 8.2 | 1.91 | 2.46 |
| Free Fatty Acid Recovery, Percent | | 18.3 | 6.4 |
| Unsaponifiable Oil, Wt. Percent | 42.3 | 49.8 | 22.2 |
| Unsaponifiable Oil Recovery, Percent | | 92.7 | 11.2 |
| Iodine No. (Wijs) | 42 | 42 | 28 |
| Saponification No | 117 | 95 | 89 |
| Melting Point, °C | | 40.4 | [1] 78 |
| Moisture, Wt. Percent | 1.2 | 0.1 | 0.2 |
| Cloud Point, °F | | | |
| Pour Point, °F | | | |
| Ash, Wt., Percent | 0.08 | 0.00 | 2.39 |
| Specific Gravity | 0.948 | 0.935 | |

[1] ASTM ring and ball.

The crude wool grease in this case was dark and had a relatively high fatty acid content. The overhead product was much lighter and had a substantially reduced fatty acid content. Inorganic material in the charge (0.08 percent) and the caustic used for neutralization were eliminated in the bottoms product which had an ash content of 2.39 percent. This inorganic material, in addition to the removal of the polymerized and oxidized material in the bottoms cut, accounts for the high melting point of the bottoms product.

The foregoing examples illustrate various methods of operation of tower 1 in decolorizing wool fat. The examples also illustrate the further fractionation of a decolorized wool fat and the separation of a decolorized wool fat into wool fat wax and wool fat oil. The latter operations will be described in more detail by further reference to the drawings, which illustrate the combination of these steps with the decolorizing step in accordance with preferred modifications of the new process.

Referring to Fig. 1, the decolorized wool fat withdrawn from separator 29 through line 24 is admixed with cold solvent supplied from a cold solvent reservoir 38 through line 39, which is equipped with a pump 40. This cold solvent, similar in composition to the solvent employed in tower 10, replaces a portion of the hot solvent removed by evaporation at 29. The resulting mixture then flows through cooler 41 and the cooled mixture is then passed through valve 42 by which the pressure is released sufficiently to evaporate solvent to the extent necessary to produce the low temperature required for separating the decolorized wool fat into a wool fat wax and a wool fat oil. By this means the solution of decolorized wool fat is cooled to a temperature of approximately 0° F. From the orifice of valve 42 the mixture is discharged into chilling tank 43, in which evaporation proceeds, with the formation of a slurry of wool fat wax in the solution of solvent and wool fat oil. The evaporated solvent passes overhead through line 44, compressor 45 and condenser 46 to cold solvent reservoir 38. The slurry is withdrawn from chiller 43 through line 47 for transfer to a continuous rotary filter 48. Preferably at least two chilling tanks, such as are shown at 43, are provided whereby one may be in use as a chiller while the other is discharging into filter 48. Advantageously this slurry from chilling tanks such as shown at 43 may be discharged into an intermediate filter feed tank, not shown, from which the slurry is continuously transferred to filter 48.

Cold solvent from reservoir 38 is transferred through lines 39 and 49 to a cold solvent tank 50, which is maintained at a lower temperature and lower pressure than reservoir 38. Cooling from the temperature at 38 is produced by indirect cooling at 51 in line 49 and by partial evaporation of the cooled solvent by release of pressure at valve 52 in line 49. Cold solvent from tank 50 is transferred through line 53 by means of pump 54 to filter 48 for use in washing filter cake. A portion of this cold solvent is diverted through line 55 for use in reslurrying the washed filter cake. The slurry of filter cake is withdrawn through line 56, provided with pump 57. The filtrate solution is transferred from filter 48 through line 58 to filtrate solution tank 59. The filter is continuously blown back by gas introduced through line 60 from compressor 61, which takes suction on tank 50 and tank 59 through lines 62 and 63.

The filtrate solution is withdrawn from tank 59 through line 64 which is provided with a pump 65 and heating means 66. Line 64 discharges into a high pressure flash tower 67, in which the greater part of the solution is evaporated at the pressure of the outlet of compressor 45. The vaporized solvent passes overhead from flash tower 67 through line 68, which connects with line 44 on the upper side of compressor 45, whereby the vaporized solvent is condensed at 46 and returned to storage. The unvaporized liquid in flash tower 67 is withdrawn from the bottom thereof through line 69 and transferred to low pressure flash tower 70, in which most of the remainder of the solvent is evaporated. Vapors are withdrawn overhead through line 71 and transferred to line 68 by means of compressor 72. The wool fat oil remaining in drum 70 is transferred through line 73 to a vacuum stripper 74 in which the last trace of solvent is removed by steam introduced through line 75 and a vacuum imposed on line 76. The wool fat oil product is withdrawn through line 77.

The wool fat wax, withdrawn from filter 48 as a slurry through line 56, is transferred to a wax stripper 78. The slurry is heated at 79 to a temperature above the melting point of the wax and sufficiently high to vaporize the solvent. Vaporization is assisted by introducing steam into line 56 from line 79'. The wool fat wax product is withdrawn from stripper 78 through line 80 and the vapors pass overhead through line 81 to a jet condenser 82. The bottoms from condenser 82 are withdrawn through line 83 and the solvent vapors pass overhead through line 84, which connects with line 71 and the entrance of compressor 72, in order to return the vapors to solvent storage at 38.

The bottoms product of fractionating tower 10, which is withdrawn through line 37, may be subjected to further treatment simply for the recovery of solvent. For this purpose the liquid from line 37 is diverted through line 85 which is provided with a heater 86 and connects with a bottoms stripper 87. The pressure is reduced by means of valve 88 sufficiently low to evaporate in stripper 87, with the assistance of steam introduced at 89, substantially all the solvent present. The solvent vapors pass overhead through line 90 which connects with line 81. Thus jet condenser 82 effects condensation of steam employed to assist vaporization in stripper 78 and stripper 87 and impose a vacuum on each of these vessels. The final bottoms product is withdrawn from stripper 87 through line 91.

The foregoing treatment of the bottoms product of tower 10 is that which is employed ordinarily when no soaps are introduced into tower 10. When such soaps are present it may be desired to convert the soaps to fatty acids and then decolorize the fatty acid product thus obtained in a treatment similar to that of tower 10. For this purpose the bottoms from line 37 are diverted through line 92. Acid, such as sulfuric acid, is introduced into line 92 from line 93. The resulting mixture passes through a suitable mixer 94 and the acidified mixture is introduced into settling tank 95. In tank 95 the lower aqueous phase is withdrawn through line 96 and the upper oily phase is withdrawn through line 97. The fatty acid product thus obtained may be withdrawn through line 98, but it is preferred to subject this product to decolorization treatment by connecting line 97 with an intermediate point of the fatty acid decolorizing tower 99.

Tower 99 is generally similar in construction and operation to tower 10. Solvent at the necessary temperature is supplied through line 100 which connects with line 14 and is provided with heating means 101. The operating conditions of tower 99 are selected to separate a small bottoms fraction containing the color bodies of the original wool grease charge. This bottoms fraction conveniently may be treated to recover solvent therefrom by transferring it to line 85 by means of line 102. The decolorized fatty acid product is separated from the bulk of the solvent in reflux tank 103, from which the solvent vapors are transferred to line 32 through line 104. The fatty acid product separated at 103 is transferred through line 105 by means of pump 106 to a high pressure flash drum 107, heat being supplied at 108. The fatty acid product is passed successively through high pressure flash tower 107, low pressure flash tower 109, and stripper 110, whose method of operation is generally similar to that of vessels 67, 70 and 74. The solvent vapors in towers 107 and 109 are returned to storage at 38 by means of line 111, which connects with line 68, and by means of line 112, which connects with line 84. The decolorized fatty acid product is withdrawn through line 113. Alternatively, the bottoms product from tower 10 may be merely washed with solvent to remove color and the decolorized soaps may then be acidified.

Inevitably there occurs some loss of solvent from the system illustrated in Fig. 1, particularly in solution in the products. To replace such loss makeup solvent is introduced to hot solvent reservoir 11 through line 12, as described above. There is, furthermore, a continuous flow of solvent from the circuit including reservoir 11 to the circuit including reservoir 38 in the form of the solvent mixed with the liquid withdrawn from reflux drums 29 and 103 and in the form of the solvent stripped from the bottoms from tower 10. It may be that the flow of such solvent from the hot solvent circuit to the cold solvent circuit will be in excess of the amount required to maintain the necessary quantity of solvent in the cold solvent circuit. Line 114 is provided to return solvent from the cold circuit to the hot circuit by connecting line 39 with line 32.

In the event it is desired to recover the decolorized wool fat as a final product, without separating it into wool fat wax and wool fat oil, the reflux liquid passing through line 34 may be diverted through line 115 which connects directly with line 64. In that operation the whole decolorized wool fat product is recovered at 77.

Fig. 2 illustrates the modification of the invention in which the wool grease is first decolorized and the decolorized product is then subjected to further fractionation in a second tower to obtain a relatively small overhead as a sterol concentrate. In Fig. 2 certain parts of the apparatus of Fig. 1 are duplicated, and such duplicate parts are indicated by the same reference numeral employed in Fig. 1, with the subscript "a." It will be understood that the above description of the operation of the various parts of Fig. 1 applies also to such parts as are duplicated in Fig. 2. Referring to Fig. 2, the solvent phase passing overhead from tower 10a may be transferred directly to a second fractionating tower 116, by means of line 117 which connects line 28a with tower 116. Alternatively all the solvent phase from tower 10a may be treated to remove solvent therefrom in drum 29a as described in connection with Fig. 1, and the reflux liquid separated in 29a may be passed to tower 116 by diverting the liquid passing through line 34a to tower 116 through line 118, by means of pump 119.

Fractionating tower 116 is generally similar in construction and operation to tower 10a and is adapted to impose on the decolorized wool fat operating conditions which fractionate the decolorized wool fat into a relatively small overhead fraction constituting approximately 5–15 percent of the decolorized wool fat and a bottoms fraction comprising the remainder of the decolorized wool fat. Operating conditions for tower 116 are generally similar to those employed in tower 10a except that, in view of the smaller overhead fraction, somewhat higher operating temperatures are employed. The operating conditions for fractionating wool fat in this manner are exemplified by Table 2 above.

The solvent for tower 116 is supplied by line 120 which is provided with a pump 121 and heating means 122 and connects line 14a with a low point of tower 116. The ratio of solvent charged through line 120 to wool fat charged through lines 117 or 118 is of the same order of magnitude as the corresponding ratio of these components charged to tower 10a, the solvent which may be charged in admixture with the wool fat being ignored in this ratio. The final extract phase is withdrawn from the top of tower 116 through line 123 which connects with a reflux drum 124, whose function is generally similar to that of reflux drum 29a. Pressure is reduced at valve 125 and heat is applied at 126 to vaporize all, or substantially all, the solvent which is withdrawn overhead from drum 124 and returned to line 32a by means of line 127. The liquid phase material is withdrawn from drum 124 through line 125' which connects with a high pressure flash tower 128. Line 125' is provided with pump 129 and heating means 130. The overhead product is passed successively through high pressure flash tower 128, low pressure flash tower 131 and stripping tower 132, which operate in the manner described in connection with towers 67, 70 and 74. The small overhead product, representing a sterol concentrate of the wool fat, is withdrawn as a product through line 133. A portion of the liquid collected in drum 124 is passed through line 134 and pump 135 to the top of tower 116 as reflux.

The product removed from the process through line 133 represents a desirable derivative of wool fat because of its high concentration of sterols and as such represents a valuable product. However, it may be desirable to subject this product to separation into oil and wax components by means of the operation described in connection with chiller 43 and filter 48 of Fig. 1. It may be desirable, therefore, to pass the liquid withdrawn from drum 124 to the operation of Fig. 1 which is applied to the liquid flowing through line 34 of that figure.

The remainder of the decolorized wool fat is separated as the raffinate or bottoms fraction in tower 116 and withdrawn therefrom through line 136. It may be desirable to divert a portion of this liquid through line 137 by means of pump 138 for passage to a higher point in tower 10a as reflux liquid.

The remainder of the lower phase material withdrawn from tower 116 through line 136 is subjected to further treatment in accordance with the treatment of material withdrawn from drum 29 of Fig. 1 through line 34 of that figure. This may involve simply treatment of this product to separate solvent therefrom, or it may involve the separation of this product into wool fat oil and wool fat wax in accordance with the procedures described in connection with chiller 43 and filter 48 of Fig. 1.

The operation illustrated by Fig. 2 thus involves the separation of the wool fat into a small bottoms fraction containing the color bodies and, possibly, the soaps, separated in tower 10a, a small overhead fraction, representing a sterol concentrate, from tower 116, and a relatively large bottoms fraction, representing a decolorized wool fat, from tower 116. These fractions may be further treated by the means illustrated in Fig. 1 to recover a fatty acid fraction and wool fat oil and wool fat wax fractions.

We claim:

1. A process for refining wool fat which comprises contacting said wool fat with an alkaline neutralizing agent to convert free fatty acids to soaps, contacting the resulting mixture of soaps and neutralized wool fat with a relatively low-boiling liquefied solvent whose critical temperature is not substantially higher than 450° F. at a temperature above the temperature of maximum solubility of the wool fat in the solvent and not lower than 100° F. below the critical temperature of the solvent and under pressure effective to maintain liquid phase conditions, to extract a portion of the wool fat and reject another portion of the wool fat and said soaps, and recovering a refined wool fat from the extract.

2. A process for refining wool fat which comprises contacting said wool fat with an alkaline neutralizing agent to convert free fatty acids to soaps, flowing the resulting mixture in counter-current contact with an oppositely flowing stream of a relatively low-boiling liquefied solvent whose critical temperature is lower than 325° F., maintaining the temperature of said counter-current contact above the temperature of maximum solubility of the neutralized wool fat in the solvent and not lower than 100° F. below the critical temperature of the solvent and under pressure effective to maintain liquid phase conditions, to dissolve a major proportion of the neutralized wool fat in the solvent and reject a minor proportion of neutralized wool fat and the soaps, and recovering a refined wool fat from the extract.

3. The method of claim 2 wherein the extract solution is further treated by counter-current contact with extract previously separated from extract solution produced in a similar operation.

4. The method of claim 2 wherein a portion of the solvent contained in the extract solution is evaporated to chill the remaining extract solution to a relatively low temperature to separate a portion of the extract as a solid phase, the phases are separated, a wool fat wax is separated from the solid phase, and a wool fat oil is separated from the liquid phase.

5. A process for refining wool fat which comprises contacting said wool fat with an alkaline neutralizing agent to convert free fatty acids to soaps, introducing the resulting mixture of neutralized wool fat and soaps into a vertically elongated fractionating zone, subjecting the mixture of wool fat and soaps in said zone to counter-current contact with a stream of solvent consisting essentially of a liquefied normally gaseous hydrocarbon containing at least 3 carbon atoms per molecule and introduced as a stream into said zone at a low point thereof, maintaining the fractionating zone at a temperature effective to dissolve in said solvent stream a major proportion of the neutralized wool fat while rejecting a minor proportion of the wool fat and the soaps, withdrawing the rejected wool fat and soaps from a low point in the fractionating zone, flowing the extract solution upwardly in said zone past the point of introduction of said mixture of wool fat and soaps, flowing downwardly in that portion of said zone above said point of introduction of the mixture of wool fat and soaps a separate lower liquid phase consisting essentially of wool fat previously separated from a similar extract solution, intimately contacting the separate liquid phases in the fractionating zone above the point of introduction of the mixture of wool fat and soaps, withdrawing extract solution from said fractionating zone at a point near the top thereof, and recovering refined wool fat from the withdrawn extract solution.

6. The method of claim 5 wherein the extract solution is withdrawn from said fractionating zone, a portion of the solvent contained therein is permitted to evaporate to cool the remainder of the solution to a low temperature to precipitate a portion of the extract as a separate solids phase, the phases are separated, a wool fat wax is recovered from the solids phase, and a wool fat oil is recovered from the liquid phase.

7. A continuous process for refining wool fat by countercurrent fractionation with a solvent having a critical temperature of less than about 450° F., which method includes the steps of: forming a liquid mixture of said wool fat and an alkali adapted to neutralize said wool fat; continuously charging said mixture and said solvent into a vertically extended fractionation zone having an extract phase outlet near its upper end, a solvent inlet and raffinate phase outlet near its lower end, and a charge mixture inlet intermediate said ends; intimately contacting said mixture and said solvent within said fractionation zone at temperatures within the range near the critical temperature in which solubility decreases as temperature increases, to precipitate a raffinate phase containing substantially all soaps formed by contacting said alkali with said wool fat and to form an extract phase containing wool fat substantially free of said soaps and color bodies; separately withdrawing said extract and raffinate phases from said extract and raffinate phase outlets respectively; and recovering a refined wool fat product from said extract phase.

8. A process of treating crude wool fat containing a substantial amount of sterols and sterol esters obtained from wool scouring waters to produce a fraction rich in sterols and sterol esters, which comprises subjecting the crude wool fat to a two-stage liquid phase solvent treatment in the presence of a liquefied normally gaseous hydrocarbon solvent, maintaining conditions of temperature within a range between about 20° F. above the critical temperature of the solvent and a temperature of about 100° F. below said critical temperature and under liquefying pressure whereby in the first stage color bodies are separated and the wool fat is substantially decolorized, maintaining conditions of liquefying pressure and substantially higher temperature in the second stage whereby a fraction relatively rich in the sterols and sterol esters is separated from the decolorized product and recovering said fraction rich in sterols and sterol esters from said second stage.

9. A process for the recovery of sterols and sterol esters contained in crude fatty material obtained from wool scouring waters, which comprises subjecting the said fatty material to a decolorizing operation in the presence of a liquefied normally gaseous hydrocarbon solvent at temperatures ranging from about 100° F. below the critical temperature up to the critical temperature and at liquefying pressures, such that the color bodies separate as a liquid phase, separating said liquid phase from the decolorized fatty material, subjecting said decolorized fatty material to a fractionating operation under conditions of liquefying pressure and substantially higher temperature such that a fraction relatively rich in said sterols and sterol esters separates as a liquid phase from a heavier phase containing the major portion of the fatty material, and separating the phases.

10. A process for the recovery of sterols and sterol esters contained in the wool fatty material obtained from wool scouring waters which comprises subjecting the said fatty material to a decolorizing operation in the presence of liquefied propane solvent at temperatures of from about 110° F. to about 174° F. and under liquefying pressure so that the color bodies separate as a liquid phase, separating said liquid phase from the decolorized fatty material containing the sterols and sterol esters, subjecting said decolorized fatty material to a fractionating operation in the presence of additional said solvent, increasing the temperature in said operation to within a range of from about 183° F. to 217° F. and under liquefying pressure so that two phases are formed, one of said phases being relatively rich in fatty material, and separating said phase rich in sterols and sterol esters.

11. A process for treating crude wool fat containing a substantial amount of sterols and sterol esters obtained from wool scouring waters to produce a fraction rich in sterols and sterol esters, which comprises subjecting the crude wool fat to a two-stage liquid phase solvent treatment in the presence of a liquefied normally gaseous hydrocarbon solvent, maintaining in the first stage conditions of temperature within a range between about 20° F. above the critical temperature of the solvent and a temperature of about 100° F. below said critical temperature and under liquefying pressure whereby color bodies are separated and the wool fat is substantially decolorized, evaporating said liquefied normally gaseous hydrocarbon solvent from said decolorized wool fat to cool said wool fat to a temperature of approximately 0° F. in the second stage whereby a fraction relatively rich in the sterols and sterol esters is precipitated from the decolorized product, and recovering said precipitated fraction rich in sterols and sterol esters from said second stage.

12. A process according to claim 1 in which after said wool fat is contacted with said alkali neutralizing agent, a part of the soap is settled from the resulting mixture of soap and neutralized wool fat, and the remaining mixture of soap and wool fat is then contacted with said liquefied solvent.

HERBERT J. PASSINO.
JAMES M. MEYERS.

References Cited in the file of this patent

UNITED STATES PATENTS

| Number | Name | Date |
|---|---|---|
| 539,388 | Maertens | May 14, 1895 |
| 540,256 | Jaffe et al. | June 4, 1895 |
| 548,942 | Wingfield | Oct. 29, 1895 |
| 1,383,585 | Wilson | July 5, 1921 |
| 1,974,542 | Parkhurst et al. | Sept. 25, 1934 |
| 2,118,454 | Schaafsma | May 24, 1938 |
| 2,285,795 | Batchelder | June 9, 1942 |
| 2,288,441 | Ewing | June 20, 1942 |
| 2,329,889 | Ewing | Sept. 21, 1943 |
| 2,417,329 | Snyder | Mar. 11, 1947 |
| 2,528,482 | Young et al. | Oct. 31, 1950 |